March 28, 1939. H. LEWIN 2,152,353
ROENTGEN PHOTOGRAPHY
Filed April 16, 1936
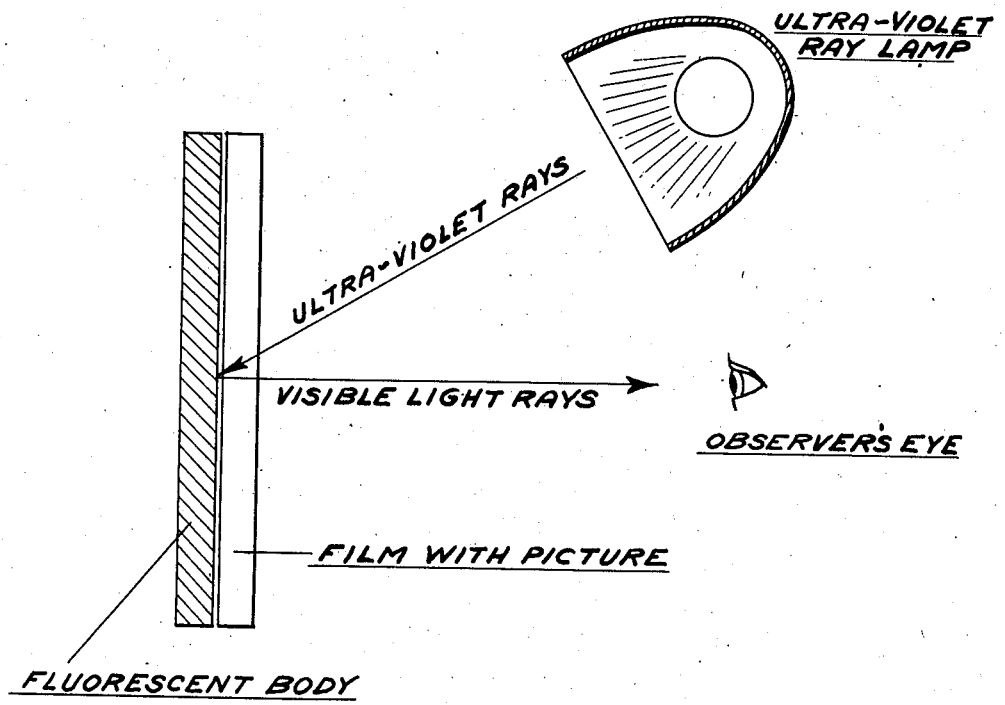
INVENTOR.
HANS LEWIN
BY
ATTORNEYS.

Patented Mar. 28, 1939

2,152,353

UNITED STATES PATENT OFFICE 2,152,353

ROENTGEN PHOTOGRAPHY

Hans Lewin, Hamburg, Germany

Application April 16, 1936, Serial No. 74,791
In Germany April 25, 1935

2 Claims. (Cl. 250—53)

My invention relates to Roentgen-ray photography, and has for its object to provide a novel method of illuminating and inspecting X-ray pictures, whereby the contrast effects between the darker and the lighter portions of the picture are increased. This heightening of contrasts enables me to employ X-ray pictures of relatively short exposure, which when viewed in the usual way (by transparency) would not yield sufficient contrast for clearness. Shortening the time of exposure offers important advantages in many cases; thus photographs of moving objects become sharper as the time of exposure is reduced. In taking X-ray pictures of parts of the human body, long exposures are often liable to produce injurious results on the patient, so that the shortening of the exposure is of material advantage in such cases.

Various expedients have been proposed and introduced for increasing the contrast effects observed when inspecting an X-ray picture, and for thus enabling pictures of relatively short exposure to be used. One of these expedients consists in applying so-called intensifying screens in conjunction with the picture proper. Another expedient, resorted to quite generally in recent practice, is to employ double-coated plates or films, that is to say carriers of suitable transparent material provided with light-sensitive coatings on both sides. When an X-ray picture on such double-coated film is viewed by transparency, the contrast effects are greatly increased owing to the successive passage of light through two photographic layers instead of only one. The reasons for this improved effect will be understood readily from the explanation given below. With my invention, it is possible to obtain practically the same quality or strength of contrast effect when using a single-coated plate or film as could be obtained or approximated hitherto with a double-coated film.

In order to enable the principles and advantages of my invention to be understood more readily, I will first outline the theoretical considerations here involved. When viewing a transparent or translucent picture, such as an X-ray picture, some portions appear darker than others. Let us assume that we inspect such a picture by transparency, so that the light passes through the picture but once in traveling from the source of light to the observer's eye. If we designate the amount of light impinging on a certain portion of the picture, as $I$, and as $I_1$ the amount of light which said portion permits to pass through (or in other words, the amount of light reaching the eye from such portion of the picture), it will be evident that the "darkening" of said picture portion can be expressed as a function of said amounts of light $I$ and $I_1$. In the investigation of such phenomena, there has been adopted the formula $$D = \log \frac{I}{I_1}$$

according to which the "darkening" or "darkening coefficient" $D$ is defined as the logarithm of the ratio of light impinging on the picture portion to light emerging from such portion. Let us now consider the case (such as occurs, for instance, when using a double-coated plate or film) where the light in traveling from the source of light passes twice through a particular darkened portion of the picture. During the first passage, the light, originally of the amount $I$, will be reduced to $I_1$. When passing through the same darkened portion for the second time, the reduced amount of light $I_1$ will be further reduced to $I_2$, in the same proportion as during the first passage. In other words $$\frac{I}{I_1} = \frac{I_1}{I_2}$$

From this we have $I_1^2 = II_2$. Multiplying by $I$, we obtain $II_1^2 = I^2I_2$ and $$\frac{I}{I_2} = \left(\frac{I}{I_1}\right)^2$$

Therefore, the "darkening" effect which is equal to log $$\frac{I}{I_1}$$

for light passing through the film but once, becomes equal to $$\log \left(\frac{I}{I_1}\right)^2 = 2 \log \frac{I}{I_1}$$

for light which has passed twice through the same portion of the film. In other words, the darkening effect is twice as great.

Now, it will be obvious that the so-called "contrast" is the impression produced on the observer by the difference between the darkening effects at different portions of the picture. If the darkening effect is doubled as explained above for each portion of the picture, it follows that the differences between the darkening effects at the several portions of the picture are likewise doubled. In other words, the contrast becomes twice as strong.

It might be suggested that the same result which I have explained above in connection with a double-coated film, might also be obtained with a single-coated film by placing the latter on a base or backing of white paper or other suitable material and then viewing the picture by direct inspection from the front, that is, from the same side that receives the light. The ordinary, visible light coming from a suitable source would then pass through the film, thus reducing the amount of light which reaches the underlying backing; the latter would then reflect the light so as to cause it to travel through the picture a second time before reaching the observer's eye. Practical trials, however, have shown that this method of viewing X-ray pictures by direct inspection is unsatisfactory. The reason for this non-success is found in the fact that the incident visible light is dispersed and partly reflected within the film, this scattered light reaching the darker portions of the picture, causing them to become partly blurred and to appear lighter than they should be, and thus impairing the contrast effects.

The accompanying drawing is an elevation, with parts in section, of an apparatus suitable for use in connection with my invention.

According to my invention, the difficulties encountered hitherto are overcome, and greatly improved results are obtained, by employing invisible, ultra-violet light instead of the ordinary visible light used hitherto. This ultra-violet light is caused to impinge on the picture from one side thereof and to pass through the picture to the other side thereof, to reach an adjacent sheet or body adapted to become fluorescent under the influence of ultra-violet rays and thus forming a converting surface, that is to say, a surface at which the invisible ultra-violet rays which have passed through the picture in one direction, are converted into rays of visible light which then passes through said picture in the opposite direction. Any well-known or approved material having the characteristic just referred to may be employed for said sheet or body. In thus passing through the picture, the incident ultra-violet light is weakened in the same degree as visible light would be, but being invisible, the ultra-violet light, if it should under go any dispersion or reflection within the plate or film before reaching the fluorescent body, will have no disturbing visible effects. The fluorescent visible light emanating from said body will then, as stated above, pass through the picture in the opposite direction, that is to say, toward the side from which the ultra-violet light is coming. The observer will then view the picture by direct inspection from the same side on which the ultra-violet light impinges upon the picture. While the light is invisible during its first passage through the picture in one direction, and of visible character during its second passage through the picture in the opposite direction, the double weakening of the light when passing through darkened portions of the picture takes place in the same ratio as described above with reference to ordinary, visible light. That is to say, the "darkening coefficient", $$\log \frac{I}{I_2}$$

for the light emerging from the picture after passing therethrough twice, will be equal to twice the darkening coefficient, $$\log \frac{I}{I_1}$$

for the light which reaches the fluorescent body after passing through the picture once. The heightening of contrasts obtained in my invention by the direct inspection of a plate or film having a single sensitized coating will thus be of the same degree as that obtainable hitherto when inspecting a double-coated plate or film by transparency. At the same time, I avoid the drawbacks referred to above which are encountered when viewing by direct inspection a picture pervious to light and illuminated by visible light which is thereupon reflected, by a suitable base or backing, through the picture and into the observer's eye.

While I have described specifically the effect obtained by my invention when using a single-coated plate or film, it will be obvious that the same advantages will be obtained with double-coated plates or films. In other words, when a double-coated plate or film is viewed by transparency according to the practice prevailing hitherto, a double weakening of the light occurs, but when such a plate or film is viewed by direct inspection, using ultra-violet light and a fluorescent body according to my invention, a quadruple weakening of the light will take place, since the light will pass twice through each of the two photographic coatings. In each case, therefore, the use of my invention doubles the contrast effects obtained.

Any suitable source of ultra-violet light may be employed, for instance a mercury vapor lamp used in conjunction with a filter of the type which eliminates visible rays and allows only ultra-violet rays to pass through.

My invention has been described above with specific reference to X-ray pictures, since its advantages make it of special value in that relation. The time of exposure may be shortened materially without impairing the contrast effects when viewing the picture in the manner set forth, notwithstanding the fact that the picture might appear to be lacking in contrast when viewed in the customary manner, that is, by transparency. As explained in the introductory portion of this specification, shortening the time of exposure increases the sharpness of the picture of moving objects, and reduces the discomfort and possible injury to the patient when taking X-ray pictures for diagnostic purposes. Instead of reducing the time of exposure, I may also reduce the strength of the current used in operating the X-ray tube, with the same results as to the character of the picture obtained. Thus, with my invention, pictures which appear to be underexposed will exhibit the same degree of contrasts as fully exposed pictures viewed in the customary manner. While, as stated, my invention is of especial advantage in connection with X-ray pictures, it is also applicable to the inspection of other pictures pervious to visible light, particularly underexposed photographs or other pictures lacking in contrast when viewed by transparency.

I claim:

1. The method of inspecting a picture pervious to visible light, which consists in placing said picture with one of its sides in proximity to a converting surface adapted to become fluorescent under the influence of ultra-violet light, exposing said picture to ultra-violet light which first impinges upon the other side of said picture and then passes through said picture to strike said converting surface and thereby convert the invisible ultra-violet light into visible light which passes through said picture in the reverse direction to said ultra-violet light, and viewing said picture by direct inspection from said other side.

2. The method of inspecting a developed photographic film substantially transparent to normal visible light rays which comprises placing one side of said film adjacent a surface having the property of becoming fluorescent under the influence of rays lying outside of the visible spectrum, projecting upon the other side of said film and said adjacent surface therebeneath said invisible rays, and viewing said film from said other side by means of visible light rays generated by said surface under the influence of said invisible rays.

HANS LEWIN.